United States Patent
Garai et al.

(10) Patent No.: US 12,314,138 B2
(45) Date of Patent: May 27, 2025

(54) PERFORMING A BACKUP OF AN OBJECT BASED ON AN IDENTIFIER ASSOCIATED WITH THE OBJECT

(71) Applicant: Cohesity, Inc., San Jose, CA (US)

(72) Inventors: Debasish Garai, Santa Clara, CA (US); Amandeep Gautam, San Jose, CA (US); Apurv Gupta, Bengaluru (IN); Jagavar Nehra, Bengaluru (IN); Emalayan Vairavanathan, Vancouver (CA)

(73) Assignee: Cohesity, Inc., San Clara, CA (US)

( * ) Notice: Subject to any disclaimer, the term of this patent is extended or adjusted under 35 U.S.C. 154(b) by 0 days.

(21) Appl. No.: 18/120,235

(22) Filed: Mar. 10, 2023

(65) Prior Publication Data
US 2024/0303162 A1    Sep. 12, 2024

(51) Int. Cl.
G06F 11/00    (2006.01)
G06F 11/14    (2006.01)

(52) U.S. Cl.
CPC ...... *G06F 11/1451* (2013.01); *G06F 11/1435* (2013.01); *G06F 11/1464* (2013.01)

(58) Field of Classification Search
CPC ............. G06F 11/1451; G06F 11/1435; G06F 11/1464
USPC ...................................................... 714/1–57
See application file for complete search history.

(56) References Cited

U.S. PATENT DOCUMENTS

| | | | |
|---|---|---|---|
| 10,635,632 B2 | 4/2020 | Guturi et al. | |
| 2006/0167979 A1* | 7/2006 | Fuchs | H04L 67/568 707/E17.12 |
| 2009/0063487 A1* | 3/2009 | Bish | G06F 16/10 |
| 2011/0060765 A1* | 3/2011 | Sieb | G06Q 30/06 707/E17.012 |
| 2011/0161723 A1* | 6/2011 | Taleck | G06F 11/1469 714/E11.073 |
| 2011/0161725 A1* | 6/2011 | Allen | G06F 11/1443 711/170 |
| 2015/0370502 A1* | 12/2015 | Aron | G06F 11/1446 |
| 2016/0249400 A1* | 8/2016 | Somasandharam | H04W 76/19 |
| 2019/0065508 A1* | 2/2019 | Guturi | G06F 16/9027 |

(Continued)

OTHER PUBLICATIONS

Extended Search Report from counterpart European Application No. 24160883.5 dated Sep. 3, 2024, 9 pp.

(Continued)

*Primary Examiner* — Sarai E Butler

(74) *Attorney, Agent, or Firm* — Shumaker & Sieffert, P.A.

(57) ABSTRACT

Data associated with an object to be stored is received from a source system for a destination logical storage container selected among a plurality of destination logical storage containers. A total number of the destination logical storage containers allowed to be concurrently supported by the source system is limited. The selected destination logical storage container is shared by a plurality of objects of the source system. Based at least in part on an identifier associated with the object, a child logical storage container corresponding to the object is identified. The child logical storage container is different from the selected destination logical storage container. The data associated with the object received for the selected destination logical storage container is automatically stored in the identified child logical storage container.

20 Claims, 4 Drawing Sheets

(56) References Cited

U.S. PATENT DOCUMENTS

| | | |
|---|---|---|
| 2019/0220360 A1 | 7/2019 | Kashi Visvanathan et al. |
| 2020/0042396 A1* | 2/2020 | Desai ................... G06F 16/128 |
| 2020/0133978 A1* | 4/2020 | Ramamurti ............... G06F 8/38 |
| 2022/0155962 A1 | 5/2022 | Mundra et al. |
| 2023/0081087 A1* | 3/2023 | Cocagne ............... G06F 3/0689 |
| | | 707/786 |
| 2023/0214300 A1* | 7/2023 | Ma ..................... G06F 11/1088 |
| | | 714/6.22 |

OTHER PUBLICATIONS

Response to Extended Search Report dated Sep. 3, 2024, from counterpart European Application No. 24160883.5 filed Apr. 1, 2025, 17 pp.

\* cited by examiner

PERFORMING A BACKUP OF AN OBJECT BASED ON AN IDENTIFIER ASSOCIATED WITH THE OBJECT

BACKGROUND OF THE INVENTION

A source system is associated with a plurality of objects (e.g., storage volume, virtual machine, files, etc.). The source system has a finite number of resources (e.g., CPU, memory, network bandwidth, etc.). The source system may utilize one or more thread pools comprised of a plurality of threads (e.g., hundreds) to back up data associated with the plurality of objects (e.g., metadata, data content) to a corresponding destination logical storage container hosted by a storage system. Each thread pool utilizes a portion of the source system's resources and is associated with a corresponding destination logical storage container. An administrator associated with the source system may limit the number of thread pools to a predetermined number to limit the number of resources used to back up the data associated with the plurality of objects and to prevent a decrease in a performance of the source system. As a result, a destination logical storage container may be shared by a plurality of objects when the number of objects to be backed up exceeds the number of thread pools and the number of destination logical storage containers hosted by the storage system.

BRIEF DESCRIPTION OF THE DRAWINGS

Various embodiments of the invention are disclosed in the following detailed description and the accompanying drawings.

DETAILED DESCRIPTION

Figure 1:
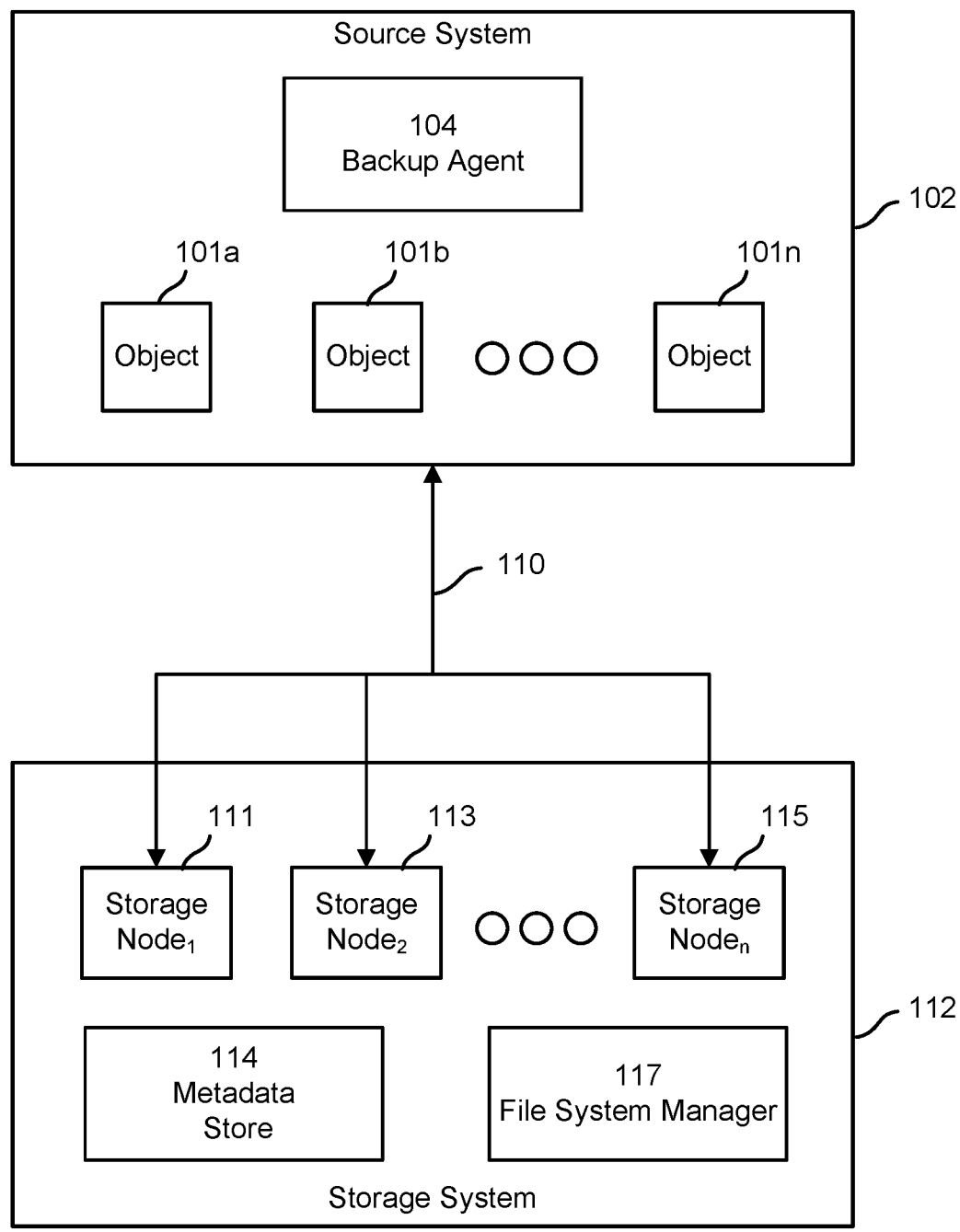
FIG. 1 is a block diagram illustrating an embodiment of a system for performing a backup of an object based on an identifier associated with the object.

A storage system receives from a source system a plurality of objects and stores the received objects in a destination logical storage container. Data associated with different objects may be provided to the storage system at different intervals such that the destination logical storage container is being continually updated with the data associated with at least one of the plurality of objects. As a result, the different objects of the source system may need to be quiesced so that the storage system is able to generate an immutable snapshot for an object associated with the destination logical storage container based on the data stored in the destination logical storage container. Quiescing some or all of the processes running on the source system may be inconvenient to the operation of the source system because it requires temporarily taking one or more objects offline for the purposes of performing a backup.

A technique to perform a backup of an object based on an identifier associated with the object is disclosed. Although the technique is described with respect to backup, the technique disclosed herein may be applicable whenever a data management operation (e.g., backup, migration, replication, archive, etc.) is performed for a cohort of data that is provided from a first system to a second system. A storage system obtains an identifier associated with an object to be stored. In some embodiments, the storage system sends to the source system a request for the identifier associated with an object to be stored and source system provides the requested identifier in response to the request. In some embodiments, the source system provides the identifier associated with the object to be stored before performing a backup of the object.

The identifier associated with the object to be stored may be a prefix associated with the object. In some embodiments, a full backup of the object is performed. In some embodiments, an incremental backup of the object is performed. An identifier may be associated for a chain of backups associated with the full backup of the object. That is, the identifier associated with the object to be stored is the same for a chain of backups associated with the object. The identifier associated with the object changes in the event the chain of backups associated with the object is broken. For example, a chain of backups associated with the object may include a first full backup of the object, a first incremental backup of the object, a second incremental backup of the object, and a third incremental backup of the object. A second full backup of the object may be performed after the third incremental backup of the object (e.g., the chain of backups has been broken). The object is associated with a first identifier for the first full backup of the object, the first incremental backup of the object, the second incremental backup of the object, and the third incremental backup of the object. The object is associated with a second identifier for the second full backup of the object.

In response to obtaining the identifier associated with the object, the storage system generates a child logical storage container and associates the generated child logical storage container with the identifier associated with the object. The storage system maintains a data structure that associates a name of the object with an identifier associated with the object and a child logical storage container corresponding to the identifier associated with the object. The data structure is updated to associate the generated child logical storage container with the identifier associated with object. In some embodiments, a plurality of child logical storage containers is pre-generated. An object having a particular identifier may be assigned to one of the pre-generated child logical storage containers.

The storage system receives from the source system data associated with an object to be stored (e.g., metadata, data contents) for a selected destination logical storage container. The selected destination logical storage container is selected among a plurality of destination logical storage containers. The source system limits a total number of the destination logical storage containers allowed to be concurrently supported by the source system. The selected destination logical storage container is shared by a plurality of objects (e.g., storage volumes) of the source system.

The storage system may have generated a plurality of child logical storage containers for a plurality of different objects. The storage system utilizes the data structure to identify a child logical storage container corresponding the identifier associated with the object. The storage system automatically stores the data associated with the object received for the selected destination logical storage container in the identified child logical storage container instead of storing the data associated with the object in the selected destination logical storage container. In some embodiments, data is received from the source system and does not include a known identifier associated with an object. Such data is stored in a destination logical storage container. In some embodiments, the data is periodically removed from the destination logical storage container.

After the storage system has finished storing the data associated with the object in the identified child logical storage container, the storage system generates an immutable snapshot of the data associated with the object by cloning the child logical storage container that is storing the data associated with the object. The storage system may utilize the data associated with the object that is stored in the cloned child logical storage container to generate a view of the data associated with the object. The view of the data associated with the object may be represented using a tree data structure. An example of a tree data structure may be a snapshot tree, which is described in U.S. Pat. No. 10,635,632 entitled "Snapshot Archive Management," which is incorporated herein by reference for all purposes.

A plurality of different objects may be backed up from the source system to the storage system. The storage system is configured to perform the above process for each of the different objects. A child logical storage container is specific to one or more versions of an object having the identifier associated with the object. The storage system generates a corresponding child logical storage container for each of the plurality of different objects. As a result, an immutable snapshot of an object may be generated that does not include the data associated with one or more other objects.

FIG. 1 is a block diagram illustrating an embodiment of a system for performing a backup of an object based on an identifier associated with the object. In the example shown, system 100 includes source system 102 and storage system 112. Source system 102 includes a plurality of objects 101a, 101b, . . . , 101n. Although three objects are shown in FIG. 1, source system 102 may include n objects. An example of an object may be a storage volume, a virtual machine, a file, a database, etc. Source system 102 may be comprised of one or more servers, one or more computing devices, one or more storage devices, and/or a combination thereof.

Source system 102 may include backup agent 104. Backup agent 104 may be configured to cause source system 102 to perform a backup (e.g., a full backup or incremental backup) of the plurality of objects 101a, 101b, . . . , 101n. In some embodiments, backup agent 104 is running on source system 102. In some embodiments, backup agent 104 is running in one of the one or more objects 103. In some embodiments, a backup agent 104 is running on source system 102 and a separate backup agent 104 is running in one of the one or more object 103. In some embodiments, an object includes a backup function and is configured to perform a backup on its own without backup agent 104. In some embodiments, source system 102 includes a backup function and is configured to perform a backup on its own without backup agent 104. In some embodiments, storage system 112 may provide instructions to source system 102, causing source system 102 to execute backup functions without the backup agent 104.

Storage system 112 includes a plurality of storage nodes 111, 113, . . . , 115. Although three storage nodes are shown in FIG. 1, storage system 112 may include n storage nodes.

In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of storage system 112.

In some embodiments, a storage node of storage system 112 includes a processor, memory, and a plurality of storage devices. The plurality of storage devices may include one or more solid state drives, one or more hard disk drives, or a combination thereof.

In some embodiments, a storage node of storage system 112 includes a processor and memory, and is coupled to a separate storage device. The separate storage device may include one or more storage devices (e.g., flash storage devices). A storage device may be segmented into a plurality of partitions. Each of the storage nodes 111, 113, . . . , 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

In some embodiments, a storage node of storage system 112 includes a processor, memory, and a storage device. The storage node may be coupled to a separate storage device. The separate storage device may include one or more storage devices. A separate storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

Storage system 112 may be a cloud instantiation of a storage system. A configuration of cloud instantiation of storage system 112 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of storage system.

Source system 102 is coupled to storage system 112 via connection 110. Connection 110 may be a wired or wireless connection. Connection 110 may be a local area network (LAN), a wireless area network (WAN), a storage area network (SAN), intranet, the Internet, etc. Source system 102 may provide data associated an object to any of the storage nodes 111, 113, . . . , 115. Source system 102 may receive data associated with a stored object from any of the storage nodes 111, 113, . . . , 115.

Source system 102 has a finite number of resources (e.g., CPU, memory, network bandwidth, etc.). The number of available resources of source system 102 may limit a number of destination logical storage containers hosted by storage system 112. In some embodiments, the number of available resources of storage system 112 may limit a number of destination logical storage containers hosted by storage system 112. Source system 102 may utilize one or more thread pools comprised of a plurality of threads (e.g., hundreds) to back up data associated with the plurality of objects 101a, 101b, ..., 101n (e.g., metadata, data content) to storage system 112. Storage system 112 includes a corresponding destination logical storage container for each of the plurality of thread pools. The corresponding destination logical storage container may be hosted by any of the storage nodes 111, 113, ..., 115. Each thread pool utilizes a portion of source system 102's resources. An administrator associated with source system 102 may limit the number of thread pools to a predetermined number to limit the number of resources used to back up the data associated with the plurality of objects and to prevent a decrease in a performance of source system 102. As a result, a destination logical storage container hosted by storage system 112 may be shared by a plurality of objects when the number of objects to be backed up exceeds the number of thread pools and the number of destination logical storage containers hosted by storage system 112.

The data associated with the plurality of objects may be received at different intervals such that a destination logical storage container hosted by the storage system 112 is being continually updated with the data associated with at least one of the plurality of objects. As a result, some or all of the processes running on source system 112 may need to be quiesced so that storage system 112 is able to generate an immutable snapshot for an object associated with the destination logical storage container based on the data stored in the destination logical storage container.

To generate the immutable snapshot for the object associated with the destination logical storage container without quiescing some or all of the processes running on source system 102, storage system 112 is configured to obtain an identifier associated with an object to be stored. In some embodiments, the storage system 112 requests for the identifier associated with an object to be stored and source system 102 provides the requested identifier in response to the request. In some embodiments, the source storage 102 provides the identifier associated with the object to be stored before performing a backup of the object.

The identifier associated with the object to be stored may be a prefix associated with the object to be stored. In some embodiments, a full backup of the object is performed. In some embodiments, an incremental backup of the object is performed. The identifier associated with the object to be stored is the same for a chain of backups associated with the object. The identifier associated with the object changes in the event the chain of backups associated with the object is broken. For example, a chain of backups associated with the object may include a first full backup of the object, a first incremental backup of the object, a second incremental backup of the object, and a third incremental backup of the object. A second full backup of the object may be performed after the third incremental backup of the object (e.g., the chain of backups has been broken). The object is associated with a first identifier for the first full backup of the object, the first incremental backup of the object, the second incremental backup of the object, and the third incremental backup of the object. The object is associated with a second identifier for the second full backup of the object.

In response to obtaining the identifier associated with the object, the storage system 112 is configured to generate a child logical storage container and associate the generated child logical storage container with the identifier associated with the object. The child logical storage container is configured to store data associated with one or more versions of the object having the identifier associated with the object. For example, the data associated with a full backup of an object and the data associated with one or more subsequent incremental backups of the object may be stored in the child logical storage container. Storage system 112 maintains a data structure that associates a name of an object with an identifier associated with an object and a child logical storage container corresponding to the identifier associated with the object. The data structure is updated to associate the generated child logical storage container with the identifier associated with object and the name of the object.

Storage system 112 is configured to host a plurality of destination logical storage containers. A destination logical storage container may be hosted by any of the storage nodes 111, 113, ..., 115. Storage system 112 is configured to receive from source system 102 data associated with the object to be stored for a destination logical storage container. The destination logical storage container is selected among a plurality of destination logical storage containers. In some embodiments, a destination logical storage container is selected based on a thread pool associated with source system. For example, a first thread pool is associated with a first destination logical storage container and the first destination logical storage container is selected for a first object because the first object is being backed up via the first thread pool. A second thread pool is associated with a second destination logical storage container and a second destination logical storage container is selected for a second object because the second object is being backed up via the second thread pool. In some embodiments, a destination logical storage container is randomly selected. In some embodiments, a destination logical storage container is selected in a round-robin fashion.

Storage system 112 may have generated a plurality of child logical storage containers for a plurality of different objects. Storage system maintains in metadata store 114 a data structure that associates a name of an object with an identifier associated with the object and a child logical storage container corresponding to the identifier associated with the object. Storage system 112 utilizes the data structure to identify a child logical storage container corresponding the identifier associated with the object. Storage system 112 is configured to automatically store in the identified child logical storage container the data associated with the object received for the selected destination logical storage container.

After storage system 112 has finished storing the data associated with the object in the identified child logical storage container, the storage system 112 is configured to generate an immutable snapshot of the data associated with the object by cloning the child logical storage container that is storing the data associated with object. Storage system 112 may utilize the data associated with the object that is stored in the cloned child logical storage container to generate a view of the data associated with the object. Storage system 112 is configured to update the data structure to associate the cloned child logical storage container with the name of the object and an identifier associated with the object. The view of the data associated with the object may be represented using a tree data structure. The tree data structure may be used to capture different views of data. The view of data associated with the object may correspond to a full backup, an incremental backup, a clone of data, a file, a replica of a backup, a backup of an object, a replica of an object, a tiered object, a tiered file, etc.

The tree data structure allows a chain of snapshot trees to be linked together by allowing a node of a later version of a snapshot tree to reference a node of a previous version of a snapshot tree. For example, a root node or an intermediate node of a snapshot tree corresponding to a second backup may reference an intermediate node or leaf node of a snapshot tree corresponding to a first backup.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure, object metadata structure, file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object, an object file, or a file to be linked together by allowing a node of a later version of a metadata structure to reference a node of a previous version of a metadata structure. A leaf node of a metadata structure may store information, such as an identifier of a data brick associated with one or more data chunks and information associated with the one or more data chunks.

Storage system 112 maintains metadata that is stored in metadata store 114, such as a chunk metadata data structure, a chunk file metadata data structure, and a brick data structure. The chunk metadata data structure is comprised of a plurality of entries. Each entry associates a chunk identifier corresponding to a data chunk with a chunk file identifier corresponding to a chunk file storing the data chunk. The chunk file metadata data structure is comprised of a plurality of entries. Each entry associates a chunk file identifier corresponding to a chunk file with one or more chunk identifiers corresponding to one or more data chunks. This indicates the one or more data chunks that are stored in the chunk file having the chunk file identifier.

The tree data structure includes a plurality of nodes that are associated with corresponding data bricks. A data brick is associated with one or more data chunks. A size of a fixed-size data chunk may be the same size as a data brick, e.g., a size of a data brick is 256 kb-512 kb. The one or more data chunks associated with the data brick may each have a size of 8 kb-16 kb. The brick metadata data structure is comprised of a plurality of entries. Each entry corresponds to a data brick and associates a brick identifier corresponding to the data brick with a chunk identifier corresponding to the one or more data chunks associated with the data brick.

Figure 2:
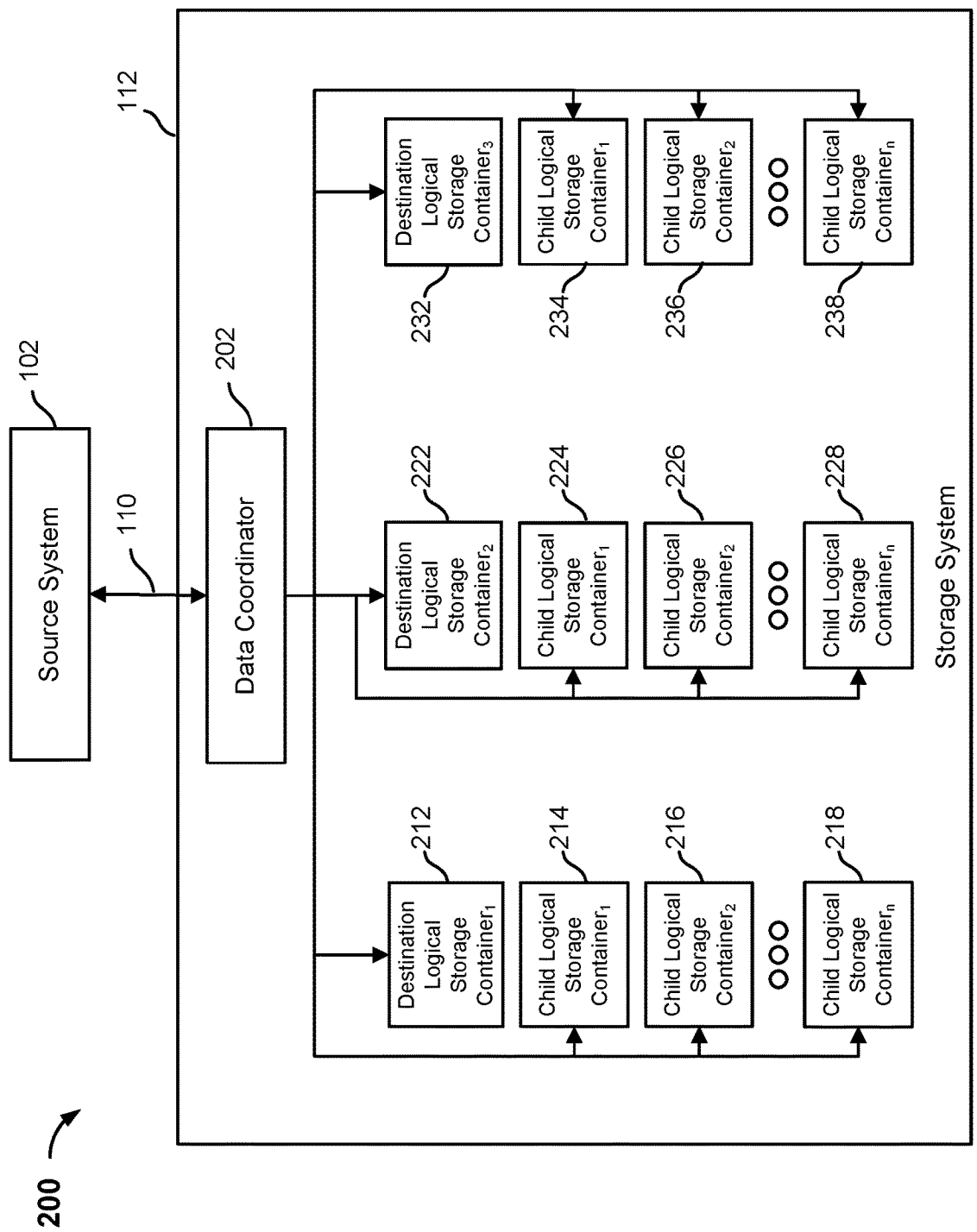
FIG. 2 is a block diagram illustrating an embodiment of a system for performing a backup of an object based on an identifier associated with the object.

FIG. 2 is a block diagram illustrating an embodiment of a system for performing a backup of an object based on an identifier associated with the object. In the example shown, system 200 depicts source system 102 being coupled to storage system 112 via connection 110. Source system 102 may provide data associated an object to any of the destination logical storage containers 212, 214, 216. Although FIG. 2 depicts storage system 112 hosting three destination logical storage containers, storage system 112 may host a specified number of destination logical storage containers. As discussed above, an administrator associated with the source system 102 may limit the number of thread pools to a predetermined number to limit the number of resources used to back up the data associated with the plurality of objects and to prevent a decrease in a performance of source system 102. Each thread pool is associated with a corresponding destination logical storage container. Thus, the number of destination logical storage containers hosted by storage system 112 depends on the number of thread pools running on source system 102.

A destination logical storage container is configured to store data associated with a plurality of objects when the number of objects to be backed up exceeds the number of thread pools and the number of destination logical storage containers hosted by the storage system. Data associated with different objects may be provided to storage system 112 at different intervals such that the destination logical storage container is being continually updated with the data associated with at least one of the plurality of objects. As a result, storage system 112 may be unable to generate an immutable snapshot for an object associated with the destination logical storage container based on the data stored in the destination logical storage container.

Although FIG. 2 depicts each of the destination logical storage containers 212, 222, 232 being associated with three child logical storage containers, each of the destination logical storage containers 212, 222, 232 may be associated with n child logical storage containers. In the example shown, destination logical storage container 212 is associated with child logical storage containers 214, 216, . . . , 218, destination logical storage container 222 is associated with child logical storage containers 224, 226, . . . , 228, and destination logical storage container 232 is associated with child logical storage containers 234, 236, . . . , 238. Each object that is to be backed up is associated with one of the destination logical storage containers 212, 222, 232. Storage system 112 may generate a child logical storage container for each object that is to be backed up from source system 102 to storage system 112. The generated child logical storage container is associated with the destination logical storage container to which the object is to be backed up. For example, an object to be backed up may be associated with destination logical storage container 222. Child logical storage container 224 may be generated for the object to be backed up. As seen in FIG. 2, child logical container 224 is associated with destination logical storage container 222.

Each child logical storage container is associated with an identifier of an object to be backed up. Data coordinator 202 of storage system 112 is configured to receive from source system 102 data associated with the object to be stored for a first destination logical storage container of the destination logical storage containers 212, 214, . . . , 216, extract the identifier of the object from the data associated with the object to be stored, identify a child logical storage container corresponding to the identifier of the object, and automatically store in the identified child logical storage container corresponding to the identifier of the object the data associated with the object received for the first destination logical storage container.

Figure 3:
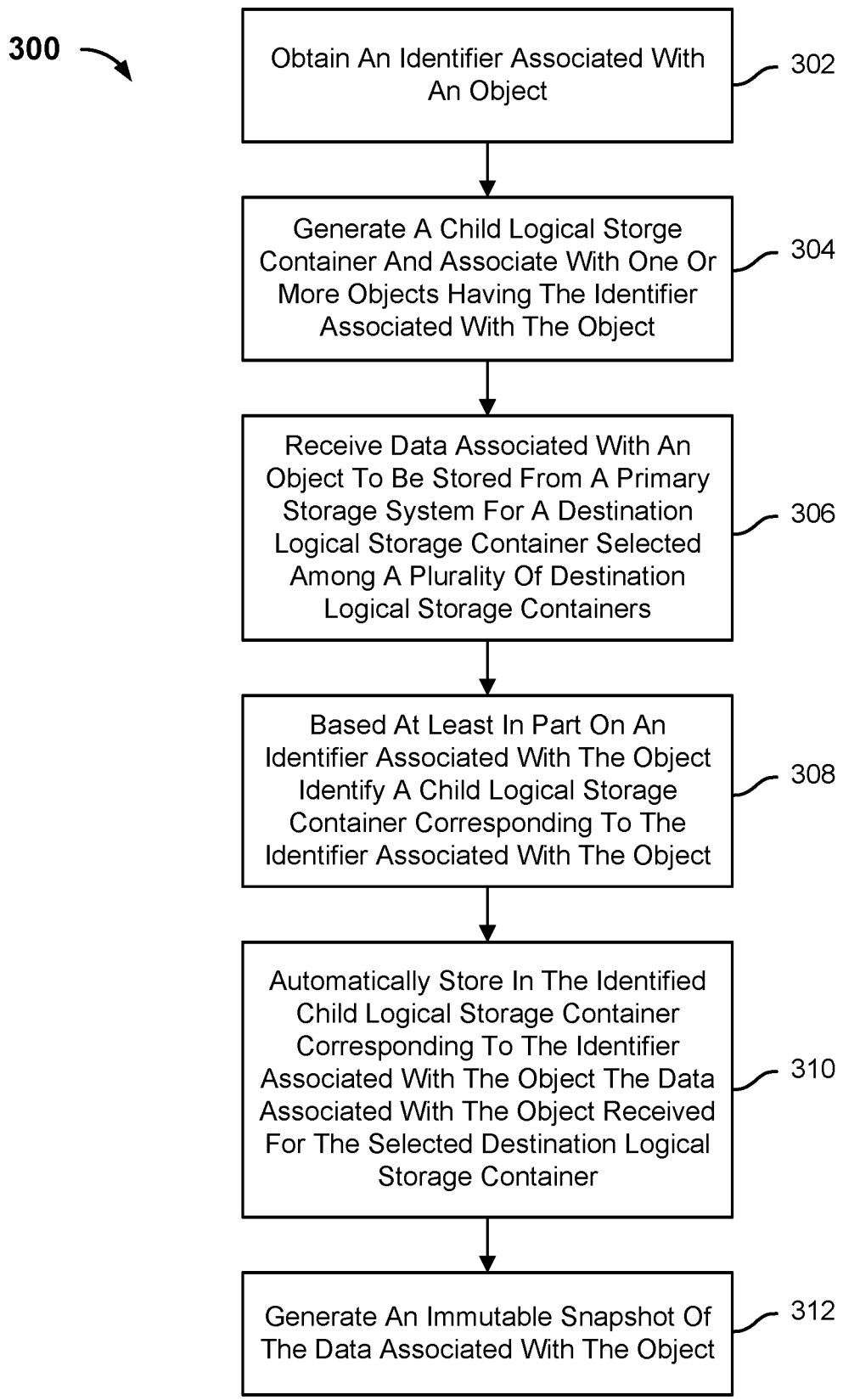
FIG. 3 is a flow diagram illustrating an embodiment of a process for performing a backup of an object based on an identifier associated with the object.

FIG. 3 is a flow diagram illustrating an embodiment of a process for performing a backup of an object based on an identifier associated with the object. In the example shown, process 300 may be implemented by a storage system, such as storage system 112.

At 302, an identifier associated with an object is obtained. In some embodiments, the storage system requests for the identifier associated with an object to be stored and a source system provides the requested identifier in response to the request. In some embodiments, the source system provides the identifier associated with the object to be stored before providing the object to be stored.

At 304, a child logical storage container is generated and associated with one or more objects having the identifier associated with the object is generated. The identifier associated with the object to be stored may be a prefix associated with the object to be stored. The prefix is associated with a prefix delimiter that indicates an end of the prefix. The prefix may be selected during a creation of the child logical storage container. The prefix may be fixed during a life cycle associated with the child logical storage container. The storage system maintains a data structure that associates an identifier associated with the object with a child logical storage container corresponding to the identifier associated with the object. The data structure is updated to associate the generated child logical storage container with the identifier associated with object.

In some embodiments, a full backup of the object is performed. In some embodiments, an incremental backup of the object is performed. The identifier associated with the object to be stored is the same for a chain of backups associated with the object. Thus, data associated with the object having a particular identifier will be stored in a child logical storage container for objects having the particular identifier regardless of whether a full backup or an incremental backup of the object having the particular identifier is performed. The identifier associated with the object changes in the event the chain of backups associated with the object is broken. For example, a chain of backups associated with the object may include a first full backup of the object, a first incremental backup of the object, a second incremental backup of the object, and a third incremental backup of the object. A second full backup of the object may be performed after the third incremental backup of the object (e.g., the chain of backups has been broken). The object is associated with a first identifier for the first full backup of the object, the first incremental backup of the object, the second incremental backup of the object, and the third incremental backup of the object. The object is associated with a second identifier for the second full backup of the object.

In some embodiments, a plurality of child logical storage containers is pre-generated. An object having a particular identifier may be assigned to one of the pre-generated child logical storage containers.

At 306, data associated with an object to be stored is received from a source system for a destination logical storage container selected among a plurality of destination logical storage containers. In some embodiments, the data associated with the object to be stored corresponds to a full backup of the object. In some embodiments, the data associated with the object to be stored corresponds to an incremental backup of the object.

The source system has a finite number of resources (e.g., CPU, memory, network bandwidth, etc.) and utilizes one or more thread pools comprised of a plurality of threads (e.g., hundreds) to back up data associated with a plurality of objects (e.g., metadata, data content) to the storage system. The storage system includes a corresponding destination logical storage container for each of the plurality of thread pools. The corresponding destination logical storage container may be hosted by any of the storage nodes associated with the storage system. Each thread pool utilizes a portion of the source system resources. An administrator associated with source system may limit the number of thread pools to a predetermined number to limit the number of resources used to back up the data associated with the plurality of objects and to prevent a decrease in a performance of the source system. As a result, a destination logical storage container hosted by the storage system may be shared by a plurality of objects when the number of objects to be backed up exceeds the number of thread pools and the number of destination logical storage containers hosted by the storage system.

The storage system is configured to host a plurality of destination logical storage containers. The destination logical storage container for the data associated with the object is selected among the plurality of destination logical storage containers. In some embodiments, a destination logical storage container is selected based on a thread pool associated with source system. For example, a first thread pool is associated with a first destination logical storage container and the first destination logical storage container is selected for a first object because the first object is being backed up via the first thread pool. A second thread pool is associated with a second destination logical storage container and a second destination logical storage container is selected for a second object because the second object is being backed up via the second thread pool. In some embodiments, a destination logical storage container is randomly selected. In some embodiments, a destination logical storage container is selected in a round-robin fashion.

At 308, a child logical storage container corresponding to an identifier associated with the object is identified based at least in part on the identifier associated with the object. The identifier associated with the object is extracted from a name associated with the object. A child logical storage container corresponding to the extracted identifier associated with the object is identified. For example, a first version of an object may have a name "34f9681a/0f82b13a_0000000000000001_34f9681e-0a9f-4db0-8e0f-15a6eab042b1" and a second version of an object may have a name "34f9681a/253e01b2_0000000000000002_34f9681e-0a9f-4db0-8e0f-15a6eab042b1." Metadata associated with an object may have a name of "34f9681a/RelRootInfo_00000201_34f9681a" In this example, the identifier associated with the object (e.g., prefix) is "34f9681a." The storage system identifies a child logical storage container for objects having the identifier "34f9681a".

At 310, the data associated the object received for the selected destination logical storage container is automatically stored in the identified child logical storage container. That is, the data associated with the object is stored in the identified child logical storage container instead of the selected destination logical storage container. In some embodiments, data is received from the source system and does not include a known identifier associated with an object. Such data is stored in a destination logical storage container. In some embodiments, the data is periodically removed from the destination logical storage container.

At 312, an immutable snapshot of the data associated with the object is generated. The immutable snapshot of the data associated with the object is generated by cloning the child logical storage container that is storing the data associated with object. The storage system updates the data structure to associate the cloned child logical storage container with the name of the object and an identifier associated with the object. The storage system may utilize a tree data structure to generate a view of the data associated with the object. The tree data structure enables the data associated with the object to be located on the storage system.

A plurality of different objects may be backed up from the source system to the storage system. The storage system is configured to perform process 300 for each of the different objects.

Figure 4:
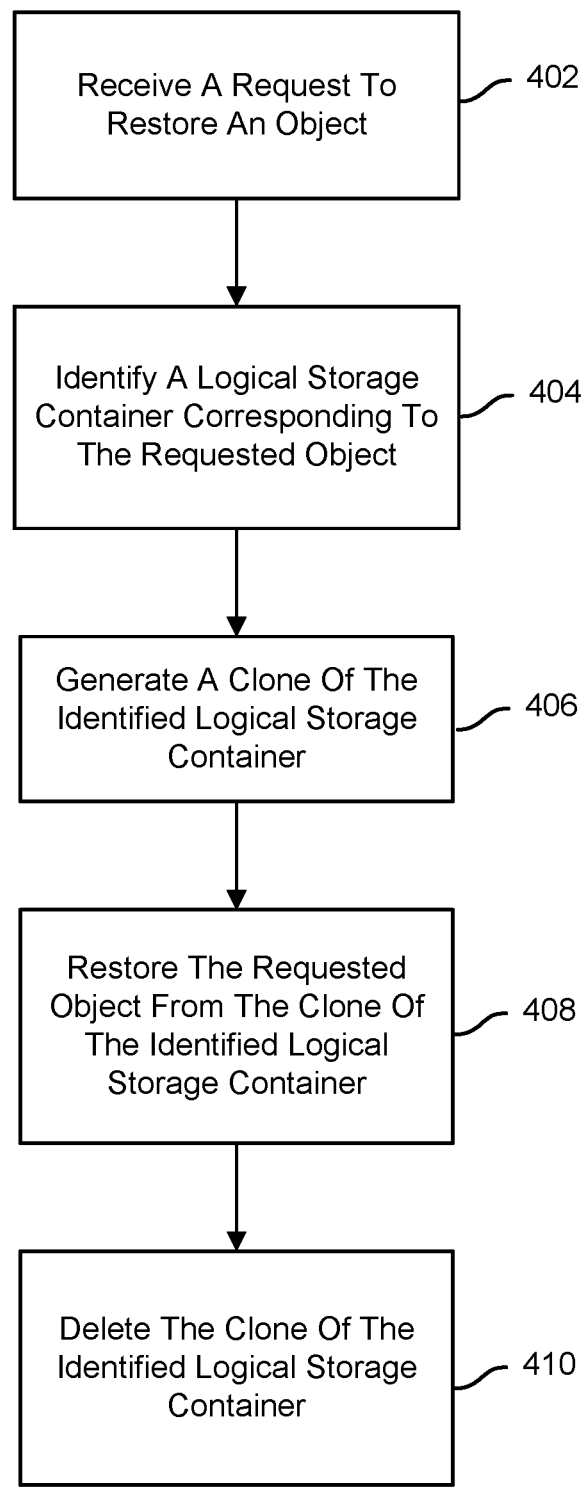
FIG. 4 is a flow diagram illustrating an embodiment of a process for restoring an object based on an identifier associated with the object.

FIG. 4 is a flow diagram illustrating an embodiment of a process for restoring an object based on an identifier associated with the object. In the example shown, process 400 may be implemented by a storage system, such as storage system 112.

At 402, a request to restore an object is received. The request includes a name associated with the object. In some embodiments, the request selects a particular version of the object from a plurality of versions of the object.

At 404, a logical storage container corresponding to the requested object is identified. The identified logical storage container corresponding to the requested object is a clone of a child logical storage container (e.g., the cloned child logical storage container generated at 312). The requested object is associated with a particular identifier. The storage system maintains a data structure that associates a name of an object with an identifier associated with the object and a logical storage container corresponding to the identifier associated with the object. The storage system utilizes the data structure to identify the logical storage container corresponding to the requested object.

At 406, a clone of the identified logical storage container is generated. The identified logical storage container stores an immutable snapshot of the requested object. The immutable snapshot may be represented using a tree data structure.

At 408, the requested object is restored from the clone of the identified logical storage container. The clone of the identified logical storage container may include a tree data structure that enables the data associated with the requested object to be located. A root node of the tree data structure is utilized to locate the data associated with the requested object by traversing the tree data structure from the root node to a plurality of leaf nodes associated with the tree data structure.

In some embodiments, the identified logical storage container is stored at a different location than the storage system (e.g., cloud archive). A clone of the identified logical storage location that is stored at the different location may be generated and stored to the storage system.

The identified logical storage container is associated with a retention time. The retention time indicates a point in time at which the identified logical storage container may be deleted from the storage system. The storage system includes a garbage collection process. The garbage collection process may delete the identified logical storage container at any point in time after which the retention time has expired. The identified logical storage container is cloned and the requested object is restored from the clone of the identified logical storage container instead of from the identified logical storage container to prevent the garbage collection process from accidentally interrupting the restoration (e.g., deleting the requested object mid-restore).

At 410, the clone of the identified logical storage container is deleted. After the requested object is restored, the clone of the identified logical storage container may be deleted. In some embodiments, the clone of the identified logical storage container is deleted in response to the restoration of the requested object being completed. In some embodiments, the clone of the identified logical storage container is deleted via a garbage collection process after the restoration of the requested object is completed. For example, the clone of the identified logical storage container may be associated with a retention time and the garbage collection process may delete the lone of the identified logical storage container after the retention time has expired.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving from a source system for a destination logical storage container selected among a plurality of destination logical storage containers, data associated with an object to be stored, wherein a total number of the destination logical storage containers allowed to be concurrently supported by the source system is limited, and the selected destination logical storage container is shared by a plurality of objects of the source system;
determining whether an identifier associated with the object matches a known identifier, wherein the data associated with the object received for the selected destination logical storage container is stored in the selected destination logical storage container based on the identifier not matching the known identifier;
based on the identifier matching the known identifier, identifying a child logical storage container corresponding to the object, wherein the child logical storage container is different from the selected destination logical storage container; and
automatically storing in the identified child logical storage container, the data associated with the object received for the selected destination logical storage container.

2. The method of claim 1, further comprising obtaining the identifier associated with the object.

3. The method of claim 2, further comprising generating the child logical storage container and associating the child logical storage container with one or more objects having the identifier associated with the object.

4. The method of claim 3, wherein the one or more objects having the identifier associated with the object are associated with a chain of backups of the object.

5. The method of claim 1, wherein the selected destination logical storage container is associated with a plurality of different objects of the source system.

6. The method of claim 1, wherein the identifier associated with the object is a prefix.

7. The method of claim 6, wherein the prefix is associated with a prefix delimiter that indicates an end of the prefix.

8. The method of claim 6, wherein the prefix is selected during a creation of the child logical storage container.

9. The method of claim 6, wherein the prefix is fixed during a life cycle associated with the child logical storage container.

10. The method of claim 1, wherein the object is a storage volume, a virtual machine, a file, or a database application.

11. The method of claim 1, wherein identifying the child logical storage container corresponding to the object comprises identifying the child logical storage container based on a data structure that associates a name of the object and the child logical storage container corresponding to the identifier associated with the object.

12. The method of claim 1, further comprising generating an immutable snapshot of the object based on the data associated with the object that is stored in the identified child logical storage container.

13. Non-transitory computer readable storage media comprising instructions that, when executed, cause processing circuitry of a computing system to:
receive from a source system for a selected destination logical storage container among a plurality of destination logical storage containers, data associated with an object to be stored, wherein a total number of the destination logical storage containers allowed to be concurrently supported by the source system is limited, and the selected destination logical storage container is shared by a plurality of objects of the source system;
determine whether an identifier associated with the object matches a known identifier, wherein the data associated with the object received for the selected destination logical storage container is stored in the selected destination logical storage container based on the identifier not matching the known identifier;
based on the identifier matching the known identifier, identify a child logical storage container corresponding to the object, wherein the child logical storage container is different from the selected destination logical storage container; and
automatically store in the identified child logical storage container, the data associated with the object received for the selected destination logical storage container.

14. The non-transitory computer readable storage media of claim 13, wherein the instructions, when executed, cause the processing circuitry to obtain the identifier associated with the object.

15. The non-transitory computer readable storage media of claim 14, wherein the instructions, when executed, cause the processing circuitry to generate the child logical storage container and associating the child logical storage container with one or more objects having the identifier associated with the object.

16. The non-transitory computer readable storage media of claim 13, wherein the identifier associated with the object is a prefix.

17. The non-transitory computer readable storage media of claim 13, wherein the object is a storage volume, a virtual machine, a file, or a database application.

18. The non-transitory computer readable storage media of claim 13, wherein to identify the child logical storage container corresponding to the object the instructions, when executed, cause the processing circuitry to identify the child logical storage container based on a data structure that associates a name of the object and the child logical storage container corresponding to the identifier associated with the object.

19. The non-transitory computer readable storage media of claim 13, wherein the instructions, when executed, cause the processing circuitry to generate an immutable snapshot of the object based on the data associated with the object that is stored in the identified child logical storage container.

20. A system, comprising:
a processor configured to:
receive from a source system for a selected destination logical storage container among a plurality of destination logical storage containers, data associated with an object to be stored, wherein a total number of the destination logical storage containers allowed to be concurrently supported by the source system is limited, and the selected destination logical storage container is shared by a plurality of objects of the source system;
determine whether an identifier associated with the object matches a known identifier, wherein the data associated with the object received for the selected destination logical storage container is stored in the selected destination logical storage container based on the identifier not matching the known identifier;
based on the identifier matching the known identifier, identify a child logical storage container corresponding to the object, wherein the child logical storage container is different from the selected destination logical storage container; and
automatically store in the identified child logical storage container, the data associated with the object received for the selected destination logical storage container; and
a memory coupled to the processor and configured to provide the processor with instructions.

* * * * *